United States Patent
Lehmann et al.

(10) Patent No.: US 9,507,239 B2
(45) Date of Patent: Nov. 29, 2016

(54) DEVICE FOR FREQUENCY CONVERSION OF A LASER BEAM GENERATED WITH A FIRST FREQUENCY BY A LASER BEAM SOURCE

(71) Applicant: ROFIN-SINAR LASER GMBH, Hamburg (DE)

(72) Inventors: Uwe Lehmann, Groebenzell (DE); Axel Reiser, Markt Indersdorf (DE)

(73) Assignee: Rofin-Sinar Laser GmbH, Hamburg (DE)

( * ) Notice: Subject to any disclaimer, the term of this patent is extended or adjusted under 35 U.S.C. 154(b) by 0 days.

(21) Appl. No.: 14/627,672

(22) Filed: Feb. 20, 2015

(65) Prior Publication Data

US 2016/0072247 A1    Mar. 10, 2016

Related U.S. Application Data

(63) Continuation of application No. PCT/EP2013/074729, filed on Nov. 26, 2013.

(30) Foreign Application Priority Data

Dec. 18, 2012  (DE) .................. 10 2012 223 527

(51) Int. Cl.
G02F 1/35 (2006.01)
H01S 3/00 (2006.01)

(52) U.S. Cl.
CPC ............ *G02F 1/3544* (2013.01); *G02F 1/3501* (2013.01); *G02F 1/3534* (2013.01); *H01S 3/0071* (2013.01); *H01S 3/0092* (2013.01);
(Continued)

(58) Field of Classification Search
CPC .. G02F 1/3532; G02F 1/3534; G02F 1/3544; G02F 1/37; G02F 2001/3503; G02F 2001/3507; G02F 2001/3509; G02F 2001/354
See application file for complete search history.

(56) References Cited

U.S. PATENT DOCUMENTS

| | | | |
|---|---|---|---|
| 5,047,668 A | 9/1991 | Bosenberg | |
| 5,384,803 A * | 1/1995 | Lai | ......... G02B 27/09 372/100 |
| 5,732,095 A | 3/1998 | Zorabedian | |

(Continued)

FOREIGN PATENT DOCUMENTS

| | | |
|---|---|---|
| DE | 102010003591 A1 | 10/2011 |
| JP | H10107357 A | 4/1998 |
| WO | 2006112303 A1 | 10/2006 |
| WO | 2011120777 A1 | 10/2011 |

*Primary Examiner* — Daniel Petkovsek
(74) *Attorney, Agent, or Firm* — Laurence A. Greenberg; Werner H. Stemer; Ralph E. Locher

(57) ABSTRACT

A device for frequency conversion of a first laser beam generated with a first frequency. The device has a first crystal for generating a second laser beam having a second frequency, which differs from the first frequency. The second laser beam propagates parallel to the first laser beam after leaving the first crystal. A second crystal, which generates from the first and second laser beams a third laser beam having a different third frequency. An optical deflection device influences the relative beam position between first and second laser beams such that the first and second laser beams, before entering into the second crystal, propagate at an angle with respect to one another, which angle differs from zero, and enter in a manner spaced apart from one another at an entrance surface of the second crystal and intersect within the second crystal with at the same time collinear phase matching.

6 Claims, 3 Drawing Sheets

(52) U.S. Cl.
CPC . *G02F 2001/3503* (2013.01); *G02F 2001/354* (2013.01); *G02F 2001/3507* (2013.01); *G02F 2001/3509* (2013.01); *G02F 2201/305* (2013.01)

(56) References Cited

U.S. PATENT DOCUMENTS

| | | | |
|---|---|---|---|
| 5,835,513 A * | 11/1998 | Pieterse | G02F 1/353 359/328 |
| 7,113,325 B1 * | 9/2006 | Moulton | G02F 1/3544 359/326 |
| 7,292,387 B2 | 11/2007 | Hoffman et al. | |
| 7,463,657 B2 * | 12/2008 | Spinelli | G02F 1/3532 372/21 |
| 8,451,530 B2 * | 5/2013 | Ide | G02B 6/42 359/328 |
| 8,553,734 B2 | 10/2013 | Dong et al. | |
| 2003/0043452 A1 | 3/2003 | Heist | |
| 2004/0240491 A1 | 12/2004 | Nebel et al. | |
| 2006/0250677 A1 | 11/2006 | Hoffman et al. | |
| 2009/0040596 A1 | 2/2009 | Mizuuchi et al. | |
| 2011/0243163 A1 * | 10/2011 | Peng | G02F 1/3534 372/22 |
| 2013/0028277 A1 | 1/2013 | Dong et al. | |

* cited by examiner

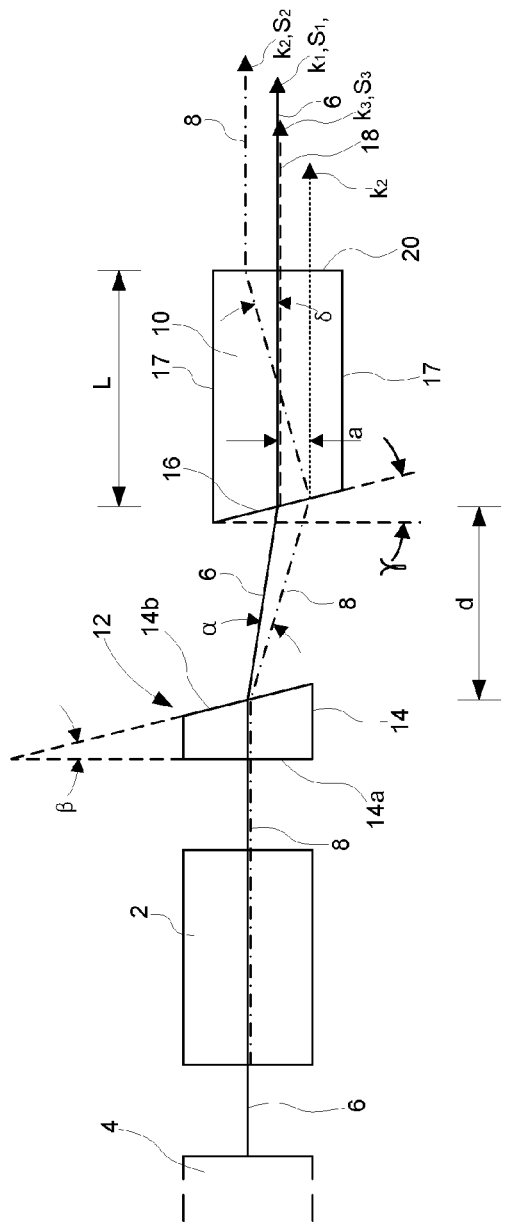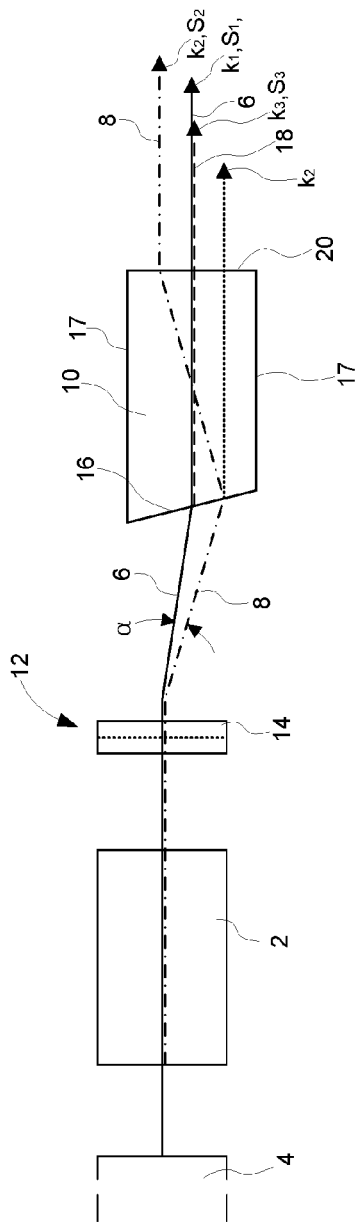

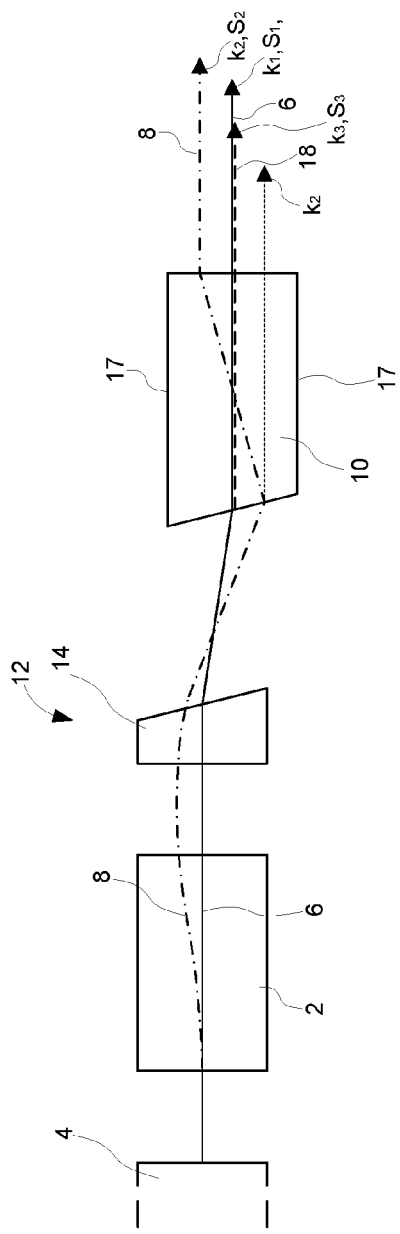
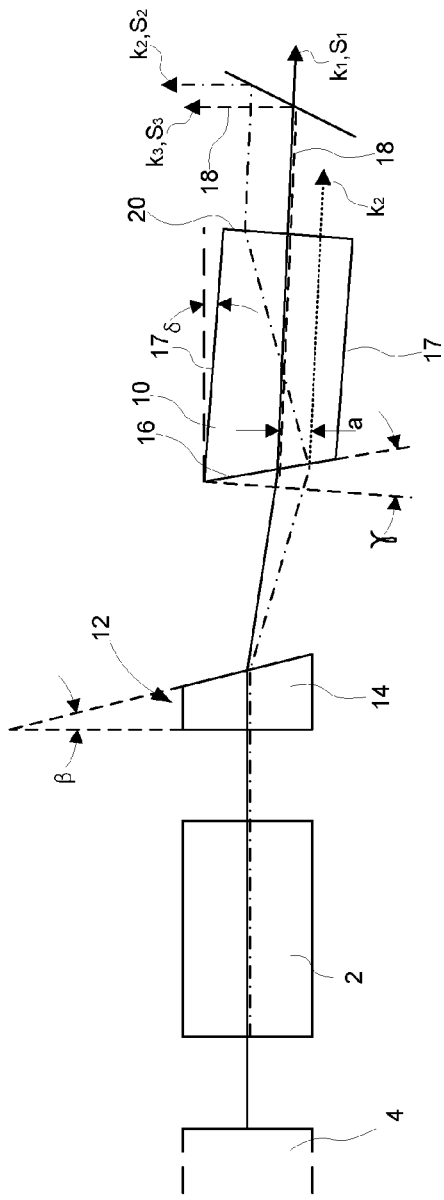

DEVICE FOR FREQUENCY CONVERSION OF A LASER BEAM GENERATED WITH A FIRST FREQUENCY BY A LASER BEAM SOURCE

CROSS-REFERENCE TO RELATED APPLICATION

This is a continuation application, under 35 U.S.C. §120, of copending international application No. PCT/EP2013/074729, filed Nov. 26, 2013, which designated the United States; this application also claims the priority, under 35 U.S.C. §119, of German patent application No. DE 10 2012 223 527.2, filed Dec. 18, 2012; the prior applications are herewith incorporated by reference in their entirety.

BACKGROUND OF THE INVENTION

Field of the Invention

The invention relates to a device for frequency conversion of a laser beam generated with a first frequency (fundamental frequency) by a laser beam source, wherein, as a result of two optically non-linear crystals being disposed in series, it is possible to generate from the laser beam present with the first frequency a laser beam whose frequency is, in particular, triple the fundamental frequency (THG, Third Harmonic Generation). In this way, it is possible to generate from an infrared laser beam generated by a laser a laser beam which lies in the UV range. Generating a laser beam with triple frequency necessitates the superimposition of the laser beam that oscillates with the fundamental frequency and propagates in the second non-linear optical crystal with the laser beam that oscillates with double the fundamental frequency and is generated in the first non-linear optical crystal. The non-linear interaction of the radiation fields with the crystal that is necessary for third harmonic generation takes place only with correspondingly high intensity of the laser beams that are being superimposed in the crystal, which can generally be achieved only with very small beam cross sections.

While a so-called non-critical phase matching is possible in the case of second harmonic generation (SHG), in the case of which matching the laser beam propagating with the first frequency and the frequency-doubled laser beam propagate collinearly with respect to one another and are superimposed over the entire length of the crystal, i.e. do not exhibit so-called "walk-off", such a non-critical phase matching is not possible in the case of a third harmonic generation or frequency tripling with the non-linear crystals available for practical applications for generating output powers, with the result that "walk-off" of the laser beams propagating in the second non-linear optical crystal for the purpose of third harmonic generation is unavoidable.

In order nevertheless to achieve a high conversion efficiency in the second optically non-linear crystal, U.S. patent publication No. 2003/0043452 A1 proposes arranging a birefringent crystal between the first optically non-linear crystal and the second optically non-linear crystal, the birefringent crystal leading to an external beam separation between the two laser beams that is directed oppositely to the internal "walk-off" in the second optically non-linear crystal.

An alternative procedure for compensating for the "walk-off" is known from U.S. Pat. No. 5,047,668, for example, wherein a critical phase matching takes place in the first optically non-linear crystal, and the "walk-off" caused as a result is utilized for "walk-off" compensation in the second optically non-linear crystal.

U.S. patent publication No. 2004/0240491 A1 discloses additionally achieving a compensation of the propagation time difference by virtue of the fact that two birefringent wedge prisms arranged displaceably relative to one another perpendicularly to the direction of propagation of the ordinary ray are arranged between the first and second optically non-linear crystals.

In these known arrangements, first and second laser beams always impinge on the entrance surface of the second optically non-linear crystal perpendicularly and in a manner spaced apart from one another and a critical collinear phase matching takes place between the first and second laser beams (wave vectors are collinear, Poynting vectors are non-collinear).

U.S. patent publication No. 2013/0028277 A1 proposes, for "walk-off" compensation, separating first and second laser beams before entering the second non-linear crystal, such that the laser beams propagate at an angle with respect to one another, which angle differs from zero, and impinge on the second non-linear crystal in a manner spaced apart from one another.

U.S. Pat. No. 7,292,387 B2 discloses a device for third harmonic generation, wherein first and second laser beams impinge obliquely at different angles of incidence at the same location on the entrance surface of the second optically non-linear crystal, wherein a non-collinear phase matching is effected within the crystal in order to minimize "walk-off" between the laser beams.

SUMMARY OF THE INVENTION

The invention is based on the object, then, of specifying a device for frequency conversion of a laser beam generated with a first frequency by a laser beam source. As a result of two optically non-linear crystals being disposed in series, it is possible to generate from the laser beam present with the first frequency a laser beam whose frequency is, in particular, triple the first frequency, and which device makes it possible to compensate for "walk-off" in the second optically non-linear crystal.

The stated object is achieved by a device containing:
a) an optically non-linear first crystal for generating a second laser beam having a second frequency, which differs from the first frequency, the second laser beam propagating parallel to the first laser beam after leaving the optically non-linear first crystal;
b) an optically non-linear second crystal, which generates from the first and second laser beams at least one third laser beam having a third frequency, which differs from the first frequency and the second frequency; and
c) an optical deflection device for influencing the relative beam position between first and second laser beams in such a way that the first and second laser beams, before entering into the second crystal, propagate at an angle with respect to one another, which angle differs from zero, and enter in a manner separated from one another at an entrance surface of the second crystal and intersect within the second crystal with at the same time collinear phase matching, wherein the entrance surface of the second crystal is inclined at a wedge angle which differs from 0° with respect to two mutually parallel, mutually opposite side surfaces of the second crystal.

Since the first and second laser beams, before entering the second crystal, propagate at an angle with respect to one another, which angle differs from zero, i.e. propagate obliquely with respect to one another, it is possible to optimize the overlap between the first and second laser beams and thus to optimize the performance of the device in a simple manner by variation of the distance between the optical deflection device and the second crystal. Such a simple optimization is not possible in the case of the devices known for example from U.S. patent publication Nos. 2003/0043452 A1 and 2004/0240491 A1, which always necessitate an exchange of optical components, for example—in the case of the arrangement from U.S. patent publication No. 2003/0043452 A1—an exchange of the birefringent element arranged between the first and second optically non-linear crystals, the choice of which is limited.

A further advantage of the arrangement according to the invention is that the same optical deflection device can be used for first and second optically non-linear crystals of different length, since an optimization of the overlap between the first and second laser beams in the second crystal is always possible by a variation of the distance between the optical deflection device and the second optically non-linear crystal and the associated beam separation at the entrance surface thereof.

Moreover, since the entrance surface of the second crystal is oriented at a wedge angle that differs from 0° with respect to the side surfaces of the second crystal, in one advantageous configuration of the invention, by the setting—adapted to the optical properties of the second crystal—of the wedge angle and of the propagation angle between the first and second laser beams upstream of the second crystal and by the setting of the orientation of the side surfaces of the second crystal relative to the direction of propagation of the first laser beam within the first crystal, it is possible to set a collinear phase matching and a propagation of the first laser beam within the second crystal, which propagation is oriented parallel to the side surfaces of the second crystal. The third laser beam, the frequency of which is in the UV range in most applications, causes degradation in the course of operation within the same crystal and at the exit location. If the first laser beam and thus in the case of collinear phase matching accordingly also the third laser beam propagate parallel to the side surfaces of the second crystal, it is possible, by means of offsetting the second crystal perpendicularly to the direction of propagation of the first laser beam, to utilize virtually the entire volume of the second crystal apart from lateral edge regions, the width of which corresponds approximately to the distance between the first and second laser beams upon entering the second crystal, for the frequency conversion. The period of utilization of the second crystal is significantly increased in this way. Furthermore, it is also possible to use smaller and thus more cost-effective second crystals.

A particularly simple construction is made possible if the optical deflection device is an optical, preferably dispersive optical element arranged between the first and second non-linear crystals in the beam path of the first and second laser beams.

In one preferred embodiment, an optically isotropic element is used as the optical element.

In a further preferred embodiment, a diffraction grating can be provided as the optical element, in which grating the deflection is effected by diffraction.

Other features which are considered as characteristic for the invention are set forth in the appended claims.

Although the invention is illustrated and described herein as embodied in a device for frequency conversion of a laser beam generated with a first frequency by a laser beam source, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 1 to 5 are basic illustrations showing alternative embodiments of a device according to the invention.

DETAILED DESCRIPTION OF THE INVENTION

Figure 5:
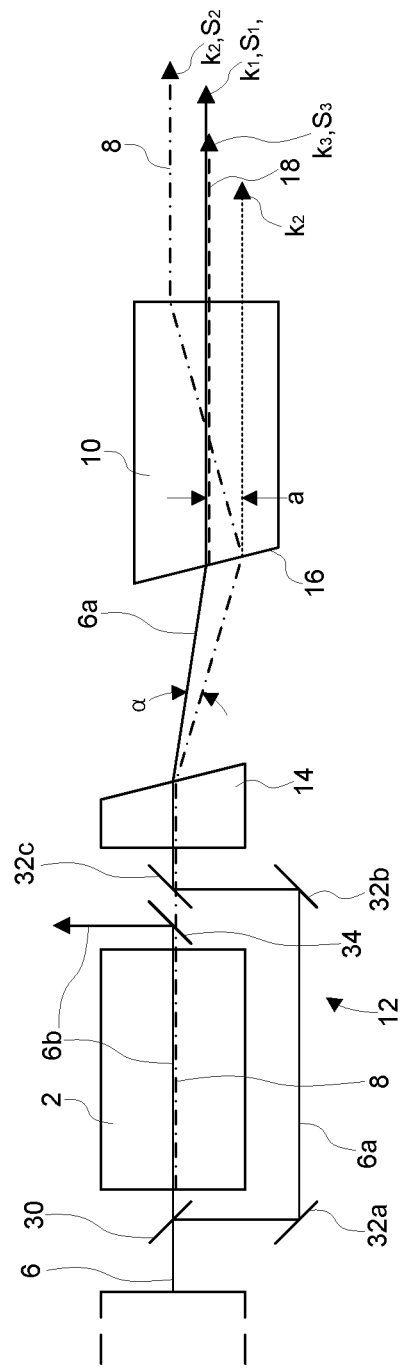

Referring now to the figures of the drawings in detail and first, particularly to FIG. 1 thereof, there is shown a device that contains an optically non-linear first crystal 2, in which, from a first, preferably linearly polarized laser beam 6 generated with a first frequency $\omega_1$ by a laser beam source 4 and propagating in the first crystal, a second linearly polarized laser beam 8 is generated, which has a second frequency $\omega_1=2\omega_1$ doubled relative to the first frequency $\omega_1$ (SHG) and is polarized perpendicularly to the first laser beam 8. The laser beam source 4 is, for example, a diode-pumped Nd:YAG solid-state laser that generates a first laser beam 6 having the wavelength $\lambda_1=1064$ nm.

In the exemplary embodiment illustrated, in the case of second harmonic generation, a so-called non-critical collinear phase matching is present, wherein the ordinary first laser beam 6 and the extraordinary second laser beam 8 are superimposed within the first crystal 2 (Poynting vectors are collinear) and the wave vectors $k_1$, $k_2$ of the first and second laser beams 6, 8 respectively, are also collinear with respect to one another.

FIG. 1 is a basic illustration showing an embodiment of a device according to the invention;

FIG. 2 is a basic illustration showing another embodiment of a device according to the invention;

FIG. 3 is a basic illustration showing another embodiment of a device according to the invention;

FIG. 4 is a basic illustration showing another embodiment of a device according to the invention; and FIG. 5 is a basic illustration showing another embodiment of a device according to the invention.

An optically non-linear second crystal 10 is disposed downstream of the first crystal 2, and the first and second laser beams 6 and 8 emerging from the first crystal 2 enter the second crystal and generate a third laser beam 18 having a third frequency $\omega_3$. In the example, the second crystal 10 provided is an LBO crystal having a crystal temperature of approximately 60°, which is used to generate a third harmonic, the frequency $\omega_3$ of which is triple the first frequency $\omega_1$ ($\omega_3=3\omega_1$).

An optical deflection device 12 is arranged between the first crystal 2 and the second crystal 10 in the beam path of the first and second laser beams 6 and 8, respectively, which optical deflection device influences or changes the relative beam position between first and second laser beams 6 and 8, respectively, such that first and second laser beams 6 and 8, respectively, before entering the second crystal 10, propagate at an angle α with respect to one another, which angle differs from zero, and impinge in a manner spaced apart from one another by the distance a and at an angle that differs from 90° on an entrance surface 16 of the second crystal 10, the entrance surface facing the optical deflection device 12. The entrance surface 16 of the second crystal 10 is additionally inclined by a wedge angle γ, which differs from 0°, with respect to mutually opposite, mutually parallel side surfaces 17 of the second crystal 10, the side surfaces being oriented perpendicularly to the plane of the drawing, in order in this way to enable the first laser beam to propagate in a manner oriented parallel to the side surfaces 17 within the second crystal 10.

In the exemplary embodiment, the deflection device 12 has a dispersive optical element 14 having entrance and exit surfaces 14a, 14b oriented obliquely with respect to one another, in the example illustrated a wedge prism having an entrance surface 14a perpendicular to the direction of propagation of the first and second laser beams 6 and 8, respectively, emerging from the first crystal 2, and having an exit surface 14b oriented in a manner inclined at a wedge angle β with respect to the entrance surface. On account of the mutually different refractive indices for the first and second laser beams 6 and 8, respectively, first and second laser beams 6 and 8, respectively, are refracted or deflected differently. In the exemplary embodiment, the dispersive optical element 14 is optically isotropic, such that the beam deflection is effected exclusively by refraction at interfaces on which the laser beams 6, 8 impinge at an angle of incidence (angle between the surface normal and the laser beams) that differs from zero.

The separation—produced by the optical element 14—of the first and second laser beams 6 and 8, respectively, by the angle α and the wedge angle γ of the entrance surface 16 of the second crystal 10 are coordinated with one another taking account of the different refractive indices of the second crystal 10 in respect of the two laser beams 6, 8 such that the wave vector $k_1$ of the first laser beam 6 is collinear with respect to the wave vector $k_2$ of the second laser beam 8 (collinear phase matching). Within the second crystal 10, moreover, the Poynting vector $S_1$ and the wave vector $k_1$ of the (ordinary) first laser beam 6 are collinear just like in the first crystal 2. However, such a collinearity is not possible for the second laser beam 8. This has the consequence that the first and second laser beams 6, 8 no longer propagate parallel to one another, that is to say that the Poynting vector $S_2$ of the second laser beam 8 is oriented obliquely at a "walk-off" angle δ with respect to the Poynting vector $S_1$ of the first laser beam 6.

In addition, the section d between the optical element 14 and the second crystal 10 is dimensioned in such a way that the distance or the spatial beam separation a between the first and second laser beams 6, 8 at the entrance surface 16 for the given "walk-off" angle δ has the effect that the first and second laser beams 6 and 8, respectively, intersect within the second crystal 10, preferably in the center between the entrance surface 16 and an exit surface 20, i.e. approximately after half of the path distance covered by the first laser beam 6 within the second crystal 10.

Within the second crystal 10, a third laser beam 18 having a third frequency $\omega_3$, which is triple the first frequency $\omega_1$ ($\omega_3 = 3\omega_1$), is then generated by means of non-linear optical processes, and the Poynting vector $S_3$ and wave vector $k_3$ of the third laser beam are collinear with respect to the Poynting vector $S_1$ and wave vector $k_1$ of the (ordinary) first laser beam 6.

In the example in FIG. 1, the dispersive optical element 14 is optically isotropic. As an alternative thereto, in this exemplary embodiment, too, wherein a non-critical phase matching takes place in the first crystal 2, for the purpose of generating a mutually obliquely oriented propagation of the first and second laser beams 6, 8, an optically anisotropic, birefringent optical element can be used instead of an optically isotropic dispersive optical element.

In the exemplary embodiment in FIG. 2, a diffraction grating is provided as the dispersive optical element 14, the first and second laser beams 6, 8 being separated by diffraction in the grating. In this exemplary embodiment, too, a non-critical phase matching takes place in the first crystal, such that the laser beams 6, 8 propagate in different directions only downstream of the diffraction grating (angular separation α), such that they are separated from one another and impinge accordingly in a spaced-apart manner and at mutually different angles of incidence on the entrance surface 16.

In the exemplary embodiment in FIG. 3, the optical element 14 is an optically anisotropic, birefringent optical element, in which the different directions of propagation of first and second laser beams 6 and 8, respectively, can be brought about both by birefringence and by a different refraction—caused by dispersion—at an interface oriented obliquely with respect to the direction of propagation of the laser beams. In the exemplary embodiment illustrated, a critical collinear phase matching with "walk-off" of the second laser beam 8 takes place in the first crystal 2, such that the first and second laser beams propagate in a manner spaced apart from one another and parallel to one another between the first crystal 2 and the optical element 14. The optical element 14 is a wedge prism having a planar entrance surface, which deflects the extraordinary second laser beam 8, wherein the first and second laser beams 6, 8 experience a different refraction upon emerging from the optical element 14. In principle, in the case, too, of a critical phase matching carried out in the first crystal 2, an optically isotropic dispersive optical element can be used instead of a birefringent optical element 14.

In the exemplary embodiments in accordance with FIGS. 1 to 3, the side surfaces 17 of the second crystal 10 are oriented parallel to the direction of propagation of the first and second laser beams 6, 8 in the first crystal 2 and accordingly schematically and in an idealized way a situation is illustrated in which the wedge angles β and γ and also the refractive indices of the optical element 14 and of the second crystal 10 are coordinated with one another such that the wave vectors $k_1$ and $k_2$ of the first and second laser beams 6 and 8, respectively, in the second crystal 10 are additionally oriented parallel to the direction of propagation or to the wave vectors $k_1$ and $k_2$ of the first and second laser beams 6 and 8, respectively, in the first crystal 2.

FIG. 4 illustrates an embodiment in which, in a departure from the embodiments illustrated in FIGS. 1 to 3, the side surfaces 17 are oriented obliquely with respect to the direction of propagation of the first and second laser beams 6, 8 in the first crystal 2. The oblique orientation of the side surfaces 17 in accordance with FIG. 4 is necessary if the refractive indices of the optical element 14 and the refractive indices of the second crystal 10 differ, which is the norm in practice if materials usually used are employed for the optical element 14. In this case, a collinearity of the wave vectors $k_1$ and $k_2$ is only possible if the latter and accordingly the side surfaces 17 of the second crystal 10 are oriented at an angle with respect to the direction $k_0$ of propagation, which angle differs from zero. In the example illustrated, there arise with the use of quartz glass as optical element 14 (refractive index n=1.449 for λ=1064 nm and n=1.460 for λ=532 nm) having a wedge angle β=12.56°, LBO (60°) as second crystal 10 (refractive index n=1.565 for λ=1064 nm and n=1.613 for λ=532 nm) having a length L=18 mm and a wedge angle γ=3° and the condition that first and second laser beams 6, 8 in the center of the second crystal 10 ("walk-off" angle δ=9.54 mrad) as required beam separation a=85.8 μm and as distance d=34.2 mm. The direction of propagation of the first laser beam 6 within the second crystal 10 then runs at an acute angle σ=3.95° with respect to the direction of propagation within the first crystal 2.

An alternative possibility for setting the relative beam position between first and second laser beams in such a way that first and second laser beams, before entering the second crystal 10, propagate at an angle with respect to one another, which angle differs from zero, and intersect within the second crystal with at the same time collinear phase matching is illustrated in FIG. 5. In this exemplary embodiment, the deflection device 12 contains a beam splitter 30, in the example illustrated by a partly transmissive mirror, which couples out one part 6a of the first laser beam 6 generated by the laser beam source 4 and, via a beam guiding device, in the example illustrated by deflecting mirrors 32a-c, is guided past the first crystal 2 and, between the latter and the optical element 14, is once again superimposed on the second laser beam 8 generated in the first crystal 2. The other part 6b is coupled into the first crystal 2 for second harmonic generation and, after leaving the first crystal 2, is coupled out by means of a dichroic mirror 34 that is transmissive only to the second laser beam 8. In this case, too, the angle α, the beam separation a and the orientation of the entrance surface 16 of the second crystal 10 are coordinated with one another such that first and second laser beams 6, 8 intersect within the second crystal 10. In the case of such an arrangement, the use of an optical element 14 illustrated as a wedge prism in FIG. 5 is no longer necessary, in principle, since the angle between the first and second laser beams 6, 8 propagating upstream of the second crystal 10 can be set arbitrarily by an external beam guiding device. Furthermore, the beam splitting and beam deflection illustrated in FIG. 5 can also be carried out by fiber-optic elements.

The device according to the invention can in principle also be realized with other types of laser, for example with a fiber or gas laser. Furthermore, other laser-active materials can also be employed, for example—without exhaustive enumeration—Nd:YVO, Yb:YAG. The use of other non-linear crystals is likewise possible, for example—likewise without exhaustive enumeration—BBO, KTP, CLBO or BiBO. Likewise, the dispersive element 14 can also consist of other materials, for example borosilicate glass BK7. The laser 4 can be a CW laser, a mode-locked laser or a laser operated in a pulsed manner, for example a Q-switched laser.

A device according to the invention is moreover not restricted to third harmonic generation, but rather can also be applied to other non-linear optical processes in which the compensation of "walk-off" between a first and a second laser beam is required for generating a third laser beam.

The invention claimed is:

1. A device for frequency conversion of a first laser beam generated with a first frequency by a laser beam source, the device comprising:
   an optically non-linear first crystal for generating a second laser beam having a second frequency, differing from the first frequency, the second laser beam propagating parallel to the first laser beam after leaving said optically non-linear first crystal, wherein said first laser beam and said second laser beam undergo non-critical collinear phase matching in said first crystal;
   an optically non-linear second crystal, generating from the first and second laser beams at least one third laser beam having a third frequency, differing from the first frequency and the second frequency; and
   an optical deflection device for influencing a relative beam position between the first and second laser beams such that the first and second laser beams, before entering into said optically non-linear second crystal, propagate at an angle with respect to one another, which said angle differs from zero, and enter in a manner spaced apart from one another at an entrance surface of said optically non-linear second crystal and intersect within said optically non-linear second crystal with collinear phase matching, wherein said entrance surface of said optically non-linear second crystal being inclined at a wedge angle which differs from 0° with respect to two mutually parallel, mutually opposite side surfaces of said optically non-linear second crystal.

2. The device according to claim 1, wherein said optically non-linear second crystal is oriented in such a way that the first laser beam propagates within said optically non-linear second crystal parallel to said mutually parallel, mutually opposite side surfaces.

3. The device according to claim 1, wherein said optical deflection device is an optical element disposed between said first and second optically non-linear crystals in a beam path of the first and second laser beams.

4. The device according to claim 3, wherein said optical element is a dispersive optical element.

5. The device according to claim 4, wherein said optical element is optically isotropic.

6. The device according to claim 3, wherein said optical element is a diffraction grating and deflection is affected by diffraction.

* * * * *